United States Patent [19]
Rifkin

[11] 4,153,090
[45] May 8, 1979

[54] REUSABLE TRANSIT CONTAINER

[76] Inventor: Arnold S. Rifkin, 1400 Sans Souci Pkwy., Wilkes-Barre, Pa. 18703

[21] Appl. No.: 927,636

[22] Filed: Jul. 24, 1978

[51] Int. Cl.² ............................................. A45C 11/00
[52] U.S. Cl. ........................................ 150/15; 150/3
[58] Field of Search ............... 150/13, 15, 3; 190/412; 70/63, 64, 68

[56] References Cited
U.S. PATENT DOCUMENTS

| | | | |
|---|---|---|---|
| 1,771,429 | 7/1930 | Wisbith | 150/3 |
| 3,078,897 | 2/1963 | Rifkin | 150/13 |
| 3,292,748 | 12/1966 | Rifkin | 150/3 X |
| 3,818,963 | 6/1974 | Whitman | 150/15 |

*Primary Examiner*—Donald F. Norton
*Attorney, Agent, or Firm*—Robert K. Youtie

[57] ABSTRACT

A reusable transit container or bag having an opening or mouth provided with a slide fastener, a message holding pocket on one side of the bag adjacent to one end of the slide fastener, and a closure tie having one end anchored on the opposite side of the bag and swingable over the slide fastener in the closed condition of the latter for detachable securement across the pocket to effectively retain the slide fastener in position and a message in the pocket.

6 Claims, 4 Drawing Figures

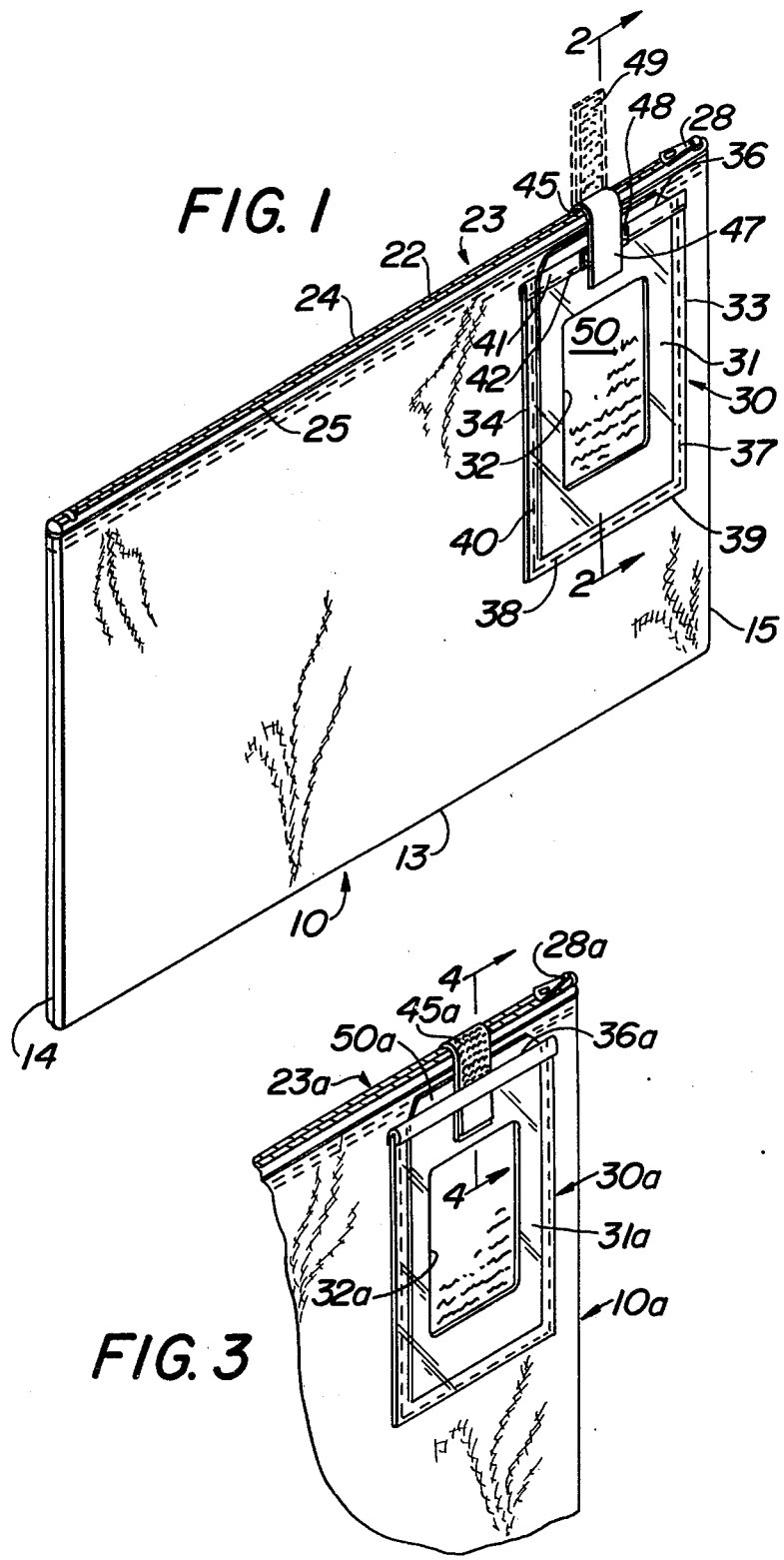
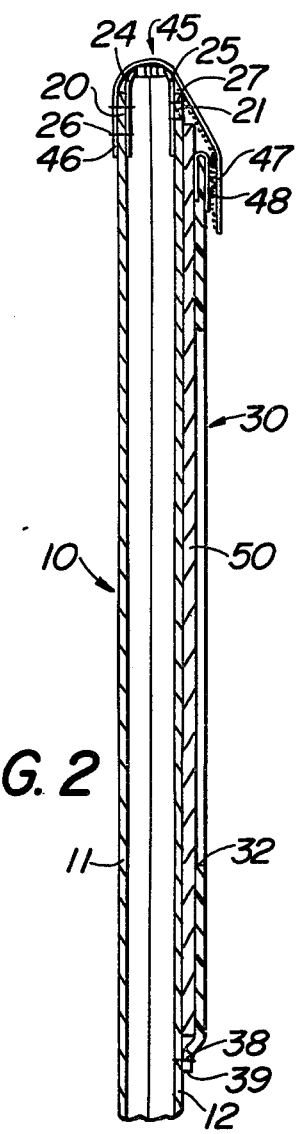
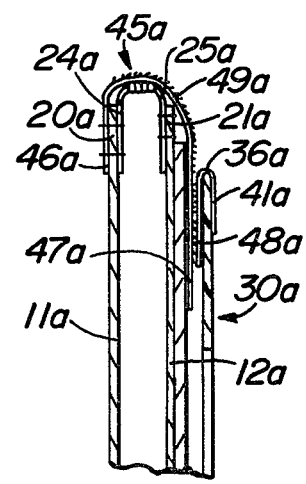

REUSABLE TRANSIT CONTAINER

BACKGROUND OF THE INVENTION

Prior to the instant invention the applicant herein obtained U.S. Pat. No. 3,078,897 directed to a similar device, but one requiring additional expense in manufacture and complexity in use, wherein the bag walls were required to be provided with through holes, and it was necessary to thread a suitable securement tie through the holes.

SUMMARY OF THE INVENTION

It is, therefore, an important object of the present invention to provide a highly improved reusable transit container which overcomes the above-mentioned difficulties, simplifies its opening and closing, without loss of protection to contents, eliminates the need for holes through the bag walls and the tedious threading of ties through the holes, and effects substantial economies in manufacture while achieving advantages in protection of contents and ease of use.

It is further object of the present invention to provide a reusable transit container having the advantageous characteristics mentioned in the preceding paragraph and which is entirely satisfactory for mailing and other shipment, and capable of repeated reuse to effect substantial savings in cost.

Other objects of the present invention will become apparent upon reading the following specification and referring to the accompanying drawings, which form a material part of this disclosure.

The invention accordingly consists in the feature of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a front perspective view showing a reusable transit container constructed in accordance with the teachings of the present invention, and shown in its closed transit condition, but with a securement tie illustrated in phantom in an opened condition.

FIG. 2 is a partial sectional view taken generally along the line 2—2 of FIG. 1.

FIG. 3 is a partial front perspective view similar to FIG. 1, but showing a slightly modified embodiment.

FIG. 4 is a partial sectional view taken generally along the line 4—4 of FIG. 3.

DESCRIPTION OF THE PREFERRED EMBODIMENTS

Referring now more particularly to the drawings, and specifically to FIGS. 1 and 2 thereof, a reusable transit container or bag is shown therein and generally designated 10. The bag or container 10 may be of generally rectangular configuration, as illustrated, or of any other desired configuration, including generally congruent back and front walls 11 and 12, respectively. The rear and front walls 11 and 12 may be fabricated of any suitable flexible sheet material, such as woven or nonwoven, and may have their bounding lower and side edges suitably secured together, as at 13, 14 and 15, as by stitching or other securing means, to define an upwardly opening container or bag.

That is, the upper bounding edges 20 and 21 of respective rear and front walls 11 and 12, extend in adjacent coextensive relation with respect to each other and are not stitched or otherwise secured directly to each other. Hence, the upper adjacent pair of bounding edges 20 and 21 may be considered as defining therebetween a bag opening or mouth 22 for the insertion and the removal therethrough of desired contents.

A slide fastener is generally designated 23, extending along the adjacent upper edges 20 and 21, and may include a pair of slide fastener elements or stringers 24 and 25 extending along and respectively secured to rear and front upper edges 20 and 21, as by stitching 26 and 27.

The slide fastener stringers 24 and 25 may be coextensive with each other and the adjacent upper edges 20 and 21, and provided with a slider 28 slidable along the stringers to close and open the latter.

In particular, the slide or slider 28 is slidable along the stringers 24 and 25 leftward, as seen in FIG. 1 to separate or open the bag mouth 22, and is slidable rightward to close the bag mouth, the condition shown in FIGS. 1 and 2.

Externally on the front wall 12, adjacent to the edge or seam 15, which terminates at its upper end proximate to the slider 28 when the latter is in closing condition, there is provided a message holder or pocket 30. The pocket may include a generally rectangular, or otherwise suitably configured sheet 31, which may be fabricated of flexible transparent material, if desired, and having a central cutout or viewing window 32, if desired.

The pocket piece or sheet 31 may be located with one side edge 33 generally vertical and extending closely along the bag side edge 15, the other side edge 34 of the sheet 31 being parallel to and spaced from the bag side edge 14. The upper edge 36 of the pocket piece or sheet 31 extends in substantial parallelism with the upper edges 20 and 21 of the rear and front walls 11 and 12, being adjacent to but spaced below the upper wall edges. The pocket piece or sheet 31 may be suitably secured to the front wall 12 in any desired manner, such as by stitching 37 extending along the side edge 33, stitching 38 extending along the lower edge 39, and additional stitching 40 extending along the side edge 34. The upper edge region of the pocket piece or sheet 31 remains unsecured or free of the wall 12, so that the pocket 30 opens upwardly generally toward the slide fastener 23 and is spaced below the upper bag edges. A wear resistant binding 41 may be provided along the upper edge 36 of the pocket piece 31, and may be suitably secured thereto, as by stitching 42.

An elongate flexible member or closure tie is generally designated 45, and may be constituted of a flexible fabric strip, say having one end anchored, as at 46 to the rear wall 11 adjacent to and spaced below the slide fastener 23 proximate to and spaced from the bag side edge 15. For example, the anchored end 46 of flexible securement tie 45 may be secured to the rear wall 11, generally rearwardly of the upper region of pocket or holder 30, by any suitable means, say the stringer securement stitching 26.

The flexible strip or closure tie 45 is swingable, as between the generally upstanding open position shown in phantom in FIG. 1 and a closing or retaining position shown in solid lines, wherein the strip extends across or astride the slide fastener 23 having its free end portion 47 outwardly of and in facing relation with respect to the upper region of pocket or holder 30. Further, on the exterior of the pocket 30, specifically on the exterior of the upper edge 36 or its binding 41, there may be provided a patch of fastener fabric, such as that of the cut pile type, as at 48. On the inner side of the securement tie or strip 45, particularly on the inner side of the free end region 47, there may be provided a complementary fastener fabric 49 for releasable mating engagement with the fastener fabric element 48, the condition shown in solid lines. While the fastener fabric elements 48 and 49 of the male-and-female cut-pile type have been found advantageous, it is believed that other separable fastener means may be employed.

It will now be apprectiated that, in the closed solid line condition of FIGS. 1 and 2, the upper open end of support or pocket 30 is effectively obstructed by the closure tie 45. Thus, a message carrier or card 50, removably inserted into the pocket 30 through the open upper end thereof is effectively retained in position. Also, the slider 28 is effectively retained in its closed location, as against inadvertent sliding thereof, by location of the closure tie 45 across the closed slide fastener stringers 24 and 25. However, by deliberate manual manipulation, the free end 47 of closure tie 45 may be stripped or separated from the open upper end of pocket 30, and folded backwardly onto the rear side of the container, thereby enabling the message member or card 50 to be readily removed and replaced, as well as permitting of quick and easy opening of the bag by sliding of the slider 28.

The slightly modified embodiment of FIGS. 3 and 4 includes a transit container or bag 10a which is similar to the first described bag, including generally congruent rear and front walls 11a and 12a entirely secured together about their bounding edges, except along the mouth edges 20a and 21a, which are provided with slide fastener elements or stringers 24a and 25a, respectively. The stringers 24a and 25a are provided with a slider 28a, and combine therewith to define a slide fastener 23a.

On the front wall 12a is provided a pocket 30a constituted of a generally rectangular pocket piece or sheet 31a secured about its lower and side edges to the front wall 12a, and remaining unsecured alont its upper edge to define an upper end opening 36a. The upper edge of the pocket sheet 31a may be bound, as at 41a, for appearance and wear resistance, if desired.

The pocket piece or sheet 31a may have a central through opening 32a or other suitable viewing window, and a message carrier or card 50a is removably inserted through the open upper end of pocket 30a for presentation of its address or other message through the viewing window 32a.

The pocket 30a is located similarly to the first described pocket 30, having its open upper end 36a adjacent to the slide fastener 23a and proximate to the right hand end of the latter at which the slider 28a is located in its closed position.

Thus, the embodiment of FIGS. 3 and 4 as described hereinbefore may be substantially identical to the first described embodiment of FIGS. 1 and 2.

However, there is provided a flexible strip or closure tie 45a corresponding to the closure tie 45 of the first described embodiment, having one end anchored, as at 46a to the rear wall 11a adjacent to the slide fastener 23a and extending therefrom to terminate in a free end portion 47a swingable to the position illustrated extending transversely across the slide fastener 23a. The closure strip or tie 45a differs from the first described closure tie 45 in that there is provided on the outer side of the closure tie 45a a securement element 49a, say of the cut-pile fastener-fabric type. Also, the free end 47a of closure tie 45a is, in its closed condition, extended across the slide fastener 23a and across the upper open end of pocket 30a, but interiorly into the pocket. The pocket sheet 31a, and particularly the upper binding 41a may be provided interiorly of the pocket with a separable fastener element 48a, such as a piece or patch of cut-pile fabric-fastener for complementary mating engagement with the fastener element 49a on the outer side of the closure tie 45a. Thus, in the illustrated condition of FIGS. 3 and 4, the closure tie 45a extends interiorly into the pocket 30a, and the fastener element 48a is located interiorly of the pocket so that the closure tie is secured in its illustrated closing relation, Of course, the closure tie may be deliberately removed from its secured relationship by suitable manipulation. However, inadvertent or accidental opening of the closure tie from the position shown in FIGS. 3 and 4 is effectively deterred.

From the foregoing, it is seen that the present invention provides a reusable transit container which effectively simplifies use of prior art containers of this general type, while effecting substantial savings in manufacturing costs permitting of sale at a reasonable price.

Although the present invention has been described in some detail by way of illustration and example for purposes of clarity of understanding, it is understood that certain changes and modifications may be made within the spirit of the invention.

What is claimed is:

1. A reusable transit container comprising a pair of facing back and front walls marginally secured together except along adjacent edge portions defining a mouth, complementary slide fastener elements secured along said mouth defining adjacent edge portions, a slider slidable on said slide fastener elements between one end of said adjacent edge portions to open the latter and the other end of said adjacent edge portions to close the same, a message holder on one of said walls adjacent to said other end of said adjacent edge portions and having an opening facing toward said adjacent edge portions for insertion and removal of a message, a closure tie secured to the other of said walls and removably extending to a closing position over said slide fastener elements and said holder opening, and detachable connection means on said holder and closure tie for releasably retaining the latter in said closing position.

2. A reusable transit container according to claim 1, said closure tie comprising a flexible elongate member having one end anchored to the adjacent edge portion of said other wall.

3. A reusable transit container according to claim 2, said detachable connection means comprising pile fabric fastener elements on said elongate member and holder.

4. A reusable transit container according to claim 3, said pile fabric fastener elements being on the exterior of said holder and the inner side of said elongate member, for detachable securement of said elongate member on the outside of said holder.

5. A reusable transit container according to claim 3, said pile fabric fastener elements being on the interior of said holder and the outer side of said elongate member, for detachable securement of the elongate member on the interior of said holder.

6. A reusable transit container according to claim 3, said holder comprising a pocket having a viewing window and being closed except for said opening.

* * * * *